United States Patent

Nichol et al.

[11] Patent Number: 6,050,825
[45] Date of Patent: Apr. 18, 2000

[54] OPAQUE, ONE-SIZE-FITS-ALL COMPUTER KEYBOARD COVER WHICH COVERS ONLY THE THREE OR FOUR ALPHA-NUMERIC ROWS

[76] Inventors: Claudia D. Nichol, 30766 Mainmast Dr.; Sandra B. Brazier, 5445 Lake Lindero Dr., both of Agoura Hills, Calif. 91301

[21] Appl. No.: 09/075,471
[22] Filed: May 8, 1998
[51] Int. Cl.[7] .................................................. G09B 13/00
[52] U.S. Cl. ....................... 434/227; 434/233; 235/145 R
[58] Field of Search ................................ 434/4, 227, 233; 235/145 R

[56] References Cited

U.S. PATENT DOCUMENTS

| | | |
|---|---|---|
| 1,560,020 | 11/1925 | Curley . |
| 1,614,390 | 1/1927 | Randall .................................... 434/227 |
| 4,075,465 | 2/1978 | Funk et al. .............................. 434/227 |
| 4,758,712 | 7/1988 | Matone, Jr. . |
| 4,902,231 | 2/1990 | Freer ....................................... 434/227 |
| 5,021,638 | 6/1991 | Nopper et al. ....................... 235/145 R |
| 5,073,050 | 12/1991 | Andrews .................................... 400/82 |
| 5,092,459 | 3/1992 | Uljanic . |
| 5,096,317 | 3/1992 | Phillippe ................................ 434/227 |
| 5,536,170 | 7/1996 | Murphy . |
| 5,551,497 | 9/1996 | Stanley . |

*Primary Examiner*—Kien T. Nguyen
*Assistant Examiner*—Bena Miller
*Attorney, Agent, or Firm*—Kelly Bauersfeld Lowry & Kelley, LLP

[57] ABSTRACT

An improved opaque computer keyboard cover (10) which covers only the three- or four alpha-numeric rows of the keyboard (12). Function and format keys (12) are not covered which provides a one-size-fits-all design. This configuration eliminates the need to order from 3000 various keyboard cover sizes. This cover is for use in keyboarding instruction and prevents peeking to accelerate user memorization. This cover can also be imprinted with a language option layout or Dvorak keyboard layout thus fully conforming the keyboard layout to one of the 60 or so languages available in the computer operating system keyboard preference options.

20 Claims, 3 Drawing Sheets

OPAQUE, ONE-SIZE-FITS-ALL COMPUTER KEYBOARD COVER WHICH COVERS ONLY THE THREE OR FOUR ALPHA-NUMERIC ROWS

BACKGROUND—CROSS REFERENCE TO RELATED APPLICATIONS

This application describes the opaque, four-row computer keyboard cover improvement described in inventors' Provisional Patent Application and pictures, filed on May 14, 1997.

BACKGROUND—FIELD OF INVENTION

This invention relates to opaque computer keyboard covers, specifically to an opaque computer keyboard cover for use in keyboarding instruction.

BACKGROUND—DISCUSSION OF PRIOR ART

Inventors know of no prior-art patents in this subject area.

Historically and currently, there is a commercially available opaque, malleable polyurethane keyboard cover which is used to teach the skill of typing and keyboarding and which assists students in memorizing the locations of keyboard letters and symbols. This keyboard cover design covers the entire top, four vertical sides, and underside edges of a flat or standard keyboard frame and includes alpha-numeric keys and all of the function and format keys. This cover form-fits to each letter, number, format, and function key. A transparent computer keyboard cover is also commercially available but its purpose is solely that of keyboard protection in the workplace.

Keyboard memorization increases typing/inputting speed and accuracy which are major goals in the educational curriculum. Hence, accelerated memorization increases the effectiveness of keyboarding course instruction. An opaque, peek-proof cover greatly assists the teacher in accomplishing accelerated keyboard memorization. To achieve the benefits of an opaque, peek-proof keyboard cover, keyboarding teachers have used hand-made cardboard covers made from boxes to provide this function albeit inadequately. Some teachers also hold a paper over a student's hands in an attempt to prevent peeking and hasten memorization. This is an ineffectual technique because its use is random and limited to the teacher's ability to cover only one or two students' hands at a time.

Current prior-art opaque keyboard covers are made to cover the entire keyboard frame including all individual keys including the function and format keys (e.g., Tab, Enter, space bar, numeric pad, F keys, etc.). Current covers have home-row indicators, i.e., raised dots or dashes on the index finger J and F keys or the middle finger K and D keys to guide the student in correct hand positioning. Current covers use grooves and rows molded to form-fit the four sides of all keys. Consequently, when the function and format keys are part of the cover design, there are over 3,000 different keyboard models each with different function and format key sizes and spacing between them. This is because each keyboard manufacturer uses different dimensions and spacing for the format and function keys of its brand/model of keyboard.

When purchasing, to assure proper fit of a prior-art opaque keyboard cover, a teacher/consumer has to order the opaque cover by brand name and model or serial number—a lengthy and time-consuming process. It requires time to determine and inventory the model/serial number of each keyboard, locate the item in a catalog/price list, compute the purchase amount, order the item from a catalog/price list, pre-pay for the order, and then wait weeks to receive the order. Additionally, any keyboard cover order must be manufactured as a low-volume custom order which is expensive to manufacture. With no high-volume orders, high-volume manufacturing techniques cannot be used. These covers prohibitively cost $18–$25 each. The disadvantages of a time-consuming ordering process and expensive and time-consuming manufacturing are prohibitive to making such an advantageous instructional tool readily available to consumers.

Finally, this opaque cover, which wraps around the entire top, sides, and bottom edges of the keyboard, must be removed and replaced each time the instructor has a change of students or switches from one keyboarding instruction software to another type of software program, e.g., graphics, etc. With many covers fitting many keyboard sizes, their removal leads to confusion as to which cover goes with which keyboard.

Ultimately, a teacher/consumer does not even try to order this product. An order of 30 opaque covers for a typical classroom could cost approximately $500 or more which is beyond a typical school's keyboarding class budget. In addition, a teacher would have to survey the keyboards used in the classroom, determine and inventory the brand name/ model number of each and all classroom keyboards; locate each brand name and model number in the catalog/price list; compute the individual prices; order and pre-pay; and then wait a month or so to receive the covers. Reordering to replace the cover on an as-needed basis using this tedious process and expensive pricing is daunting and prohibitive.

Some companies which have manufactured custom opaque covers based on brand name/model number variations have discontinued manufacturing them because the demand was insufficient to merit maintaining its production capabilities. Thus, the crucial benefits of accelerated learning and enhanced proficiency of an opaque cover are sacrificed due to the ordering effort and cost to manufacture this low-volume product. In an era when computer skills are essential for educational and workplace success, mastering keyboarding is at the apex of learning the computer skills needed to succeed in school and the workplace.

OBJECTS AND ADVANTAGES

A solution is needed and now available using this opaque, three- or four-row device. When the function keys are omitted from the opaque keyboard cover design and only the three or four alpha-numeric rows are covered, then the keyboard shape becomes uniform and universal for flat and ergonomic keyboards. These three or four rows of alpha-numeric keys are the same size and configuration on and for all models/brands of computer keyboards. Thus, one size fits all keyboards normally used in a school setting. All of the cumbersome ordering and expensive custom manufacturing are eliminated. The opaque, three- or four-row keyboard cover becomes cost effective, between $2 and $5, and within educational/retail budget allotments. For a class of 30, the cost would be $150 instead of $500 or more.

A second advantage to an opaque, three- or four row keyboard cover would be its use in maximizing computer operating system keyboard preference options. There are over 60 foreign language (including the Dvorak layout) keyboard preference options. To use these, the keyboard layout must be changed to duplicate the language option selected. There are no prior art solutions. Or each key would have to be individually capped with the new language characters-a non-solution due to the inconvenience, time involved to install correctly and remove, keeping track of all the key caps, etc. Or a separate keyboard imprinted with the language option layout would have to be purchased for any other language option. Also, a non-solution as an entire keyboard would have to be stored and switched when a language change is required. Using this opaque, three- or four-row, one-size-fits-all cover, all language options for all operating system keyboard choices can be commercially and economically produced and made available in the marketplace for all flat and ergonomic keyboards. This permits ready use of any computer operating system keyboard preference option/configuration (foreign language or American/English) by any given user or use of the same personal computer by many users who would need to change the keyboard based on their keyboard/language preference, training, or abilities simply by a one-step, on/off installation of this device.

Accordingly, several objects and advantages of a three- or four-row, opaque keyboard cover are: 1) one size fits all flat and split/ergonomic keyboards; 2) teachers/consumers can easily buy/order the four-row, opaque keyboard cover without custom ordering using a catalog/price list; 3) manufacturing becomes high-volume and streamlined thus decreasing production time; 4) because manufacturing is streamlined, the cost is drastically reduced; 5) because the cost is reduced, the three- or four-row, opaque keyboard cover becomes accessible to teachers/consumers; 6) accessibility to students results in a student population which achieves proficiency and confidence in its keyboarding capability. The 3,000 versions of model/serial number keyboard covers which have to be individually ordered are reduced to one. This is a definite advantage to the consumer, i.e., this three- or four-row, opaque keyboard cover now becomes readily available to those who need it because it is convenient to purchase and the price is reasonable.

Another embodiment comprises the same configuration of an opaque, three- or four-row alpha-numeric keyboard cover shape and includes imprinted foreign language characters which conform to the operating system keyboard preference option selected by the user. Many computer operating systems offer the option of changing the user's language of choice to any of 60 or more language options. All language operating system keyboard options require a different keyboard layout. When a user changes the language option to Portuguese, for example, the physical or keyboard layout remains unchanged. The user must then have the differences memorized to use the language option chosen. Such memorization is unlikely, inconvenient, and demands excessive concentration to use accurately.

With an opaque, one-size-fits-all, three- or four-row, one-step on/off keyboard cover, any foreign language option can be imprinted on an opaque cover, i.e., one language per cover, making the standard keyboard easily convertible from an existing keyboard layout to the layout of the language option chosen. Thus, an American user can leave a business meeting in South America, change the language preference to Portuguese, and easily input and communicate a summary of the business transacted in Portuguese by placing an opaque, four-row, imprinted Portuguese cover on the keyboard. Personal or intra- or inter-family communication is enhanced when families are split between countries of different languages. For example, a Portuguese/American user can select a Portuguese language preference option, install a Portuguese cover, and proceed to input for facile family correspondence.

A variation of the foreign language embodiment would be an opaque imprinted Dvorak-layout keyboard cover. Most, if not all, operating system keyboard preference options include a Dvorak keyboard layout choice. At present, the Dvorak keyboard cannot be readily used without removing and changing all of the individual key caps to convert from one keyboard configuration to another. However, using the opaque, four-row Dvorak layout cover, the Dvorak keyboard preference option can be readily used. This permits ready use of either QWERTY or Dvorak keyboard configuration by any given user or use of the same personal computer by many users who would need to change the keyboard based on their keyboard preference, training, or abilities simply by a one-step, on/off installation of this cover. A school of thought exists which maintains that the use of the Dvorak keyboard increases efficiency and work product. Were this school of thought more widely adopted, the opaque, four-row Dvorak keyboard cover would provide the advantages of instant keyboard conversion to Dvorak and vice versa.

This opaque, three- or four-row keyboard cover also includes the advantage of a marked midline indicator for the purpose of converting the cover from a flat keyboard shape to a split/ergonomic shape. By dividing the cover along the midline indicator, the opaque cover can be used on a split/ergonomic keyboard.

Another advantage of the opaque, three- or four-row, keyboard cover is that it is easily installed and removed from the keyboard, a one-step/on-off process. The cover does not stretch to cover the keys; it is form-fitted to and rests upon the keys. The opaque, three- or four-row keyboard cover remains securely in place during use/inputting/keyboarding.

This invention is touch-sensitive and made of lightweight, malleable polyurethane or other material which duplicates the preferred embodiment and does not impede learning or inputting text. The feel of the keys and the finger pressure required for inputting are almost as if the cover were not in use.

Further objects and advantages of our invention will become apparent from the consideration of the drawings and ensuing description.

LIST OF REFERENCE NUMERALS

Figure 1:
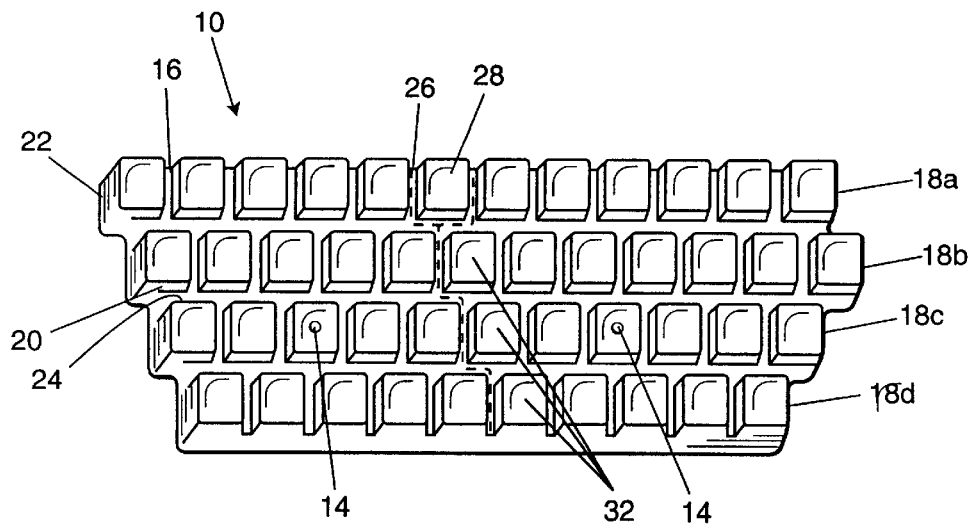
FIG. 1 is a perspective, stand-alone view of the keyboard cover.

10 four-row computer keyboard cover
12 keyboard base or frame and function keys
14 home-row indicators
16 vertical grooves
18a, b, c, d horizontal key rows 20 horizontal grooves
22 cover perimeter
24 descending side of key
26 visual or perforated line
28 6 key
32 Y, H, N keys
34 Russian/Cyrillic language layout
36 Dvorak keyboard layout
38 Backslash key

SUMMARY

The present invention resides in a cover for a partial section of a keyboard having a frame and multiple alpha-numeric, function and format keys. The cover comprises, generally, a resiliently flexible, non-transparent body which overlies a predetermined number of non-format and non-function keys which total less than all of the keys of the keyboard. Typically, the body overlies the alphabetical and numerical keys of the keyboard, oftentimes referred to as the alpha-numerical keys, and may also overlie additional keys of the keyboard. The body includes a wall extending downwardly from a perimeter of the body which envelops peripheral keys of the predetermined number of keys. The body also includes grooves within the body configured such that the body form-fits the individual predetermined number of keys, resulting in the body removably resting on the predetermined keys of the keyboard. A top surface of the body may include character inscriptions comprising foreign language alpha-numeric symbols or Dvorak keyboard symbols. The cover may also include a mid-line marking which defines a separation line for adapting the cover to an ergonomic keyboard having a separation between two sets of keys. The mid-line marking may be perforated to facilitate separation.

DESCRIPTION OF INVENTION

The opaque, four-row alpha-numeric keyboard cover 10 is comprised of thermo-molded, malleable, flexible, opaque, nontransparent polyurethane/plastic/rubber or any material that permits pressure/touch-sensitive/tactile capabilities for keyboard inputting or instruction purposes. This includes but is not limited to 10–12 mils thickness which is molded to cover and form-fit the three or four alpha-numeric rows of individual keys of a computer keyboard. It is manufactured using including but not limited to current, conventional thermo-molded plastics processing. The polyurethane, malleable material of the current keyboard cover can be obtained from conventional polyurethane suppliers. This device has home-row indicators 14, i.e., raised dots or dashes on the index finger J and F keys or the middle finger K and D keys to guide the user in correct hand positioning.

Figure 2:
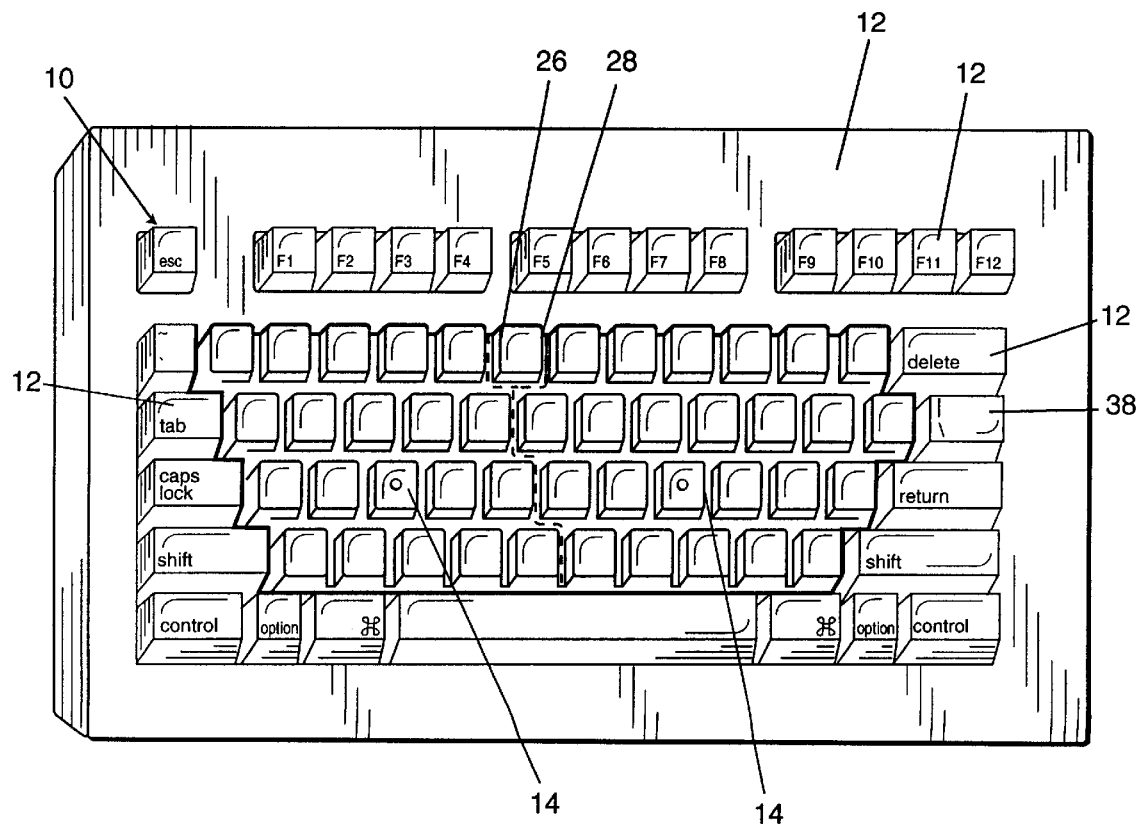
FIG. 2 is a perspective view from the top as the cover looks when placed on the computer keyboard.

FIG. 1 is a stand-alone, perspective view of the keyboard cover 10. FIG. 2 shows the cover 10 as it appears when placed for use on the keyboard 12 and covering four alpha-numeric rows 18. It is a one-piece design with the capability of becoming two pieces when divided or cut along the dotted line 26. Line 26 indicates a marked midline indicator enabling dividing or splitting the keyboard cover along the left and right vertical groove of the 6 key 28, and extending downward along left vertical grooves of Y, H, and N keys 32 for use on the split/ergonomic keyboard. Ergonomic keyboards vary as to placement of 6 key. User will determine left or right 6-key cut depending on the ergonomic keyboard configuration used.

Figure 4:
FIG. 4 is a perspective view from the side of the opaque, four-row keyboard cover illustrating the horizontal grooves.

There is no mechanical connector or connection to the keyboard 12. The weight of the cover 10 and grooves 16 shaping each key combine to ensure its proper placement. FIGS. 1 and 2 show that cover 10 is grooved or troughed vertically 16 and horizontally 20 at the base of each key so that each key is individually shaped. FIG. 4 shows each keyboard row 18 is horizontally grooved to the plane of the keyboard frame. The perimeter 22 of the cover is comprised of a vertical side of each key which descends from the top of all peripheral keys down to the plane of the keyboard frame 12 and/or slightly lower than the base of the keyboard frame. The perimeter 22 of the cover 10 is aligned with the outside edge of the top row, both sides, and lower edge of the bottom row of the four alpha-numeric rows 18a–d of the keyboard 12.

Operation of Invention

Figure 3:
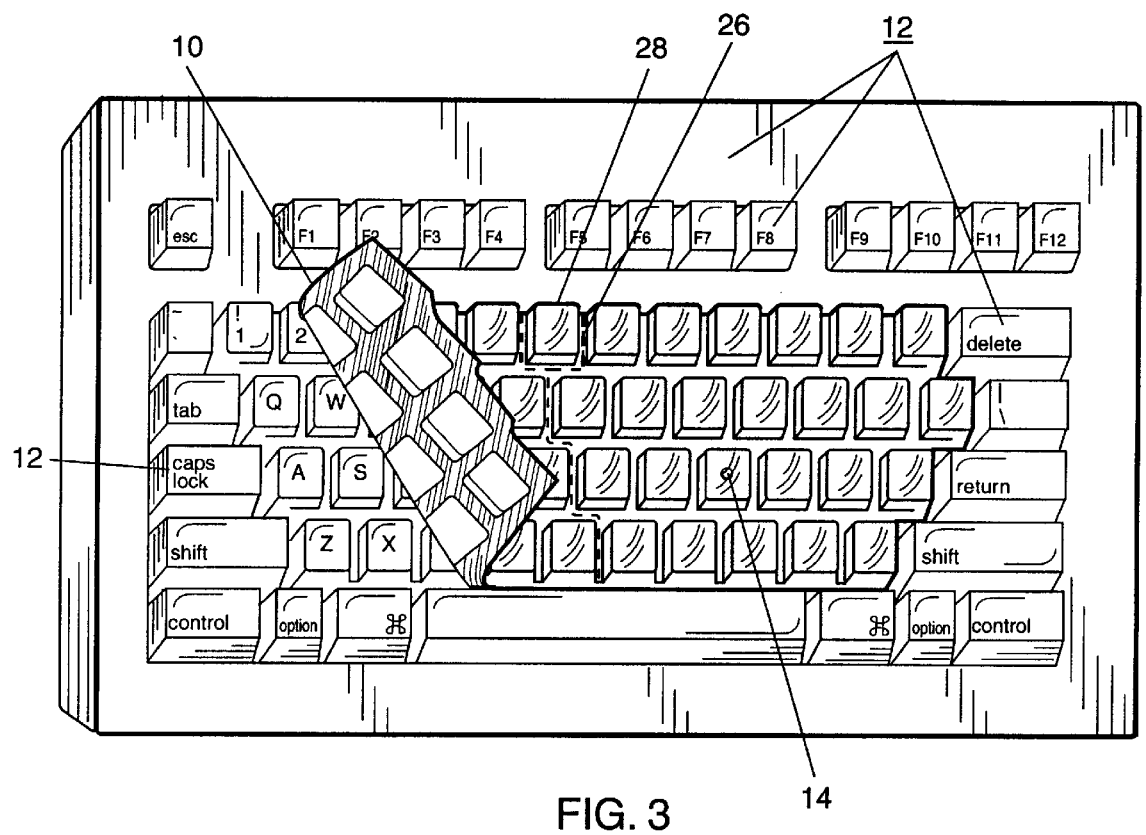
FIG. 3 is a perspective view of the cover on the keyboard with the left side of the cover partially lifted.

The two embodiments are both preferred embodiments; they are different but equal improvements in this subject area. The first preferred Embodiment 1 of a keyboard cover 10 as illustrated in FIGS. 1, 2, and 3 is an opaque keyboard cover 10 which is a one-size-fits-all computer keyboard cover for only the four alpha-numeric rows and is for the purpose of teaching keyboarding to accelerate keyboard memorization. A backslash key 38 is omitted from the cover as its placement on keyboards is variable as to location and spacing; all other keys covered by this device are not variable as to spacing and placement. Line 26 indicates a marked midline indicator enabling dividing or splitting the keyboard cover along the left and right vertical groove of the 6 key 28, and extending downward along left vertical grooves of Y, H, and N keys 32 for use on the split/ergonomic keyboard. Cover 10 comprises a one-step operation to install and remove cover 10 from keyboard 12. One simply aligns cover 10 with the top, side or bottom of the covered portion of keyboard 22 until it lays flat and the key shapes match. Cover 10 does not stretch to cover the keys; it rests upon the keys. The user then proceeds to type or input normally or as if the keyboard were uncovered. When cover 10 is not needed, user lifts a perimeter corner/edge 22 and cover easily lifts and separates from keyboard 12 for storage until next use. This device has home-row indicators 14, i.e., raised dots or dashes on the index finger J and F keys or the middle finger K and D keys to guide the user in correct hand positioning.

Figure 5:
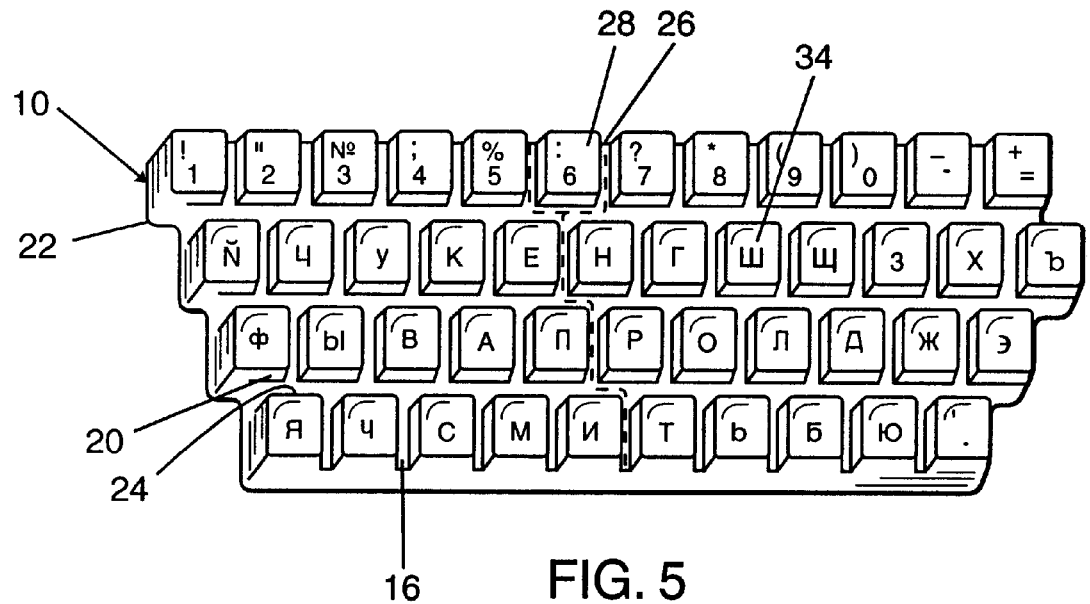
FIG. 5 is a second, co-preferred embodiment illustrating foreign Russian/Cyrillic keyboard layout displayed on the key tops.

FIG. 5 is a description of a second preferred Embodiment 2 illustrating foreign language 34 letters, characters, and symbols displayed or imprinted on the key tops, e.g., Russian/Cyrillic. Line 26 indicates a marked midline indicator enabling dividing or splitting the keyboard cover along the left and right vertical groove of the 6 key 28, and extending downward along left vertical grooves of Y, H, and N keys 32 for use on the split/ergonomic keyboard. Cover 10 is manufactured including but not limited to the use of current, conventional polyurethane imprinting/molding processes and materials.

Figure 6:
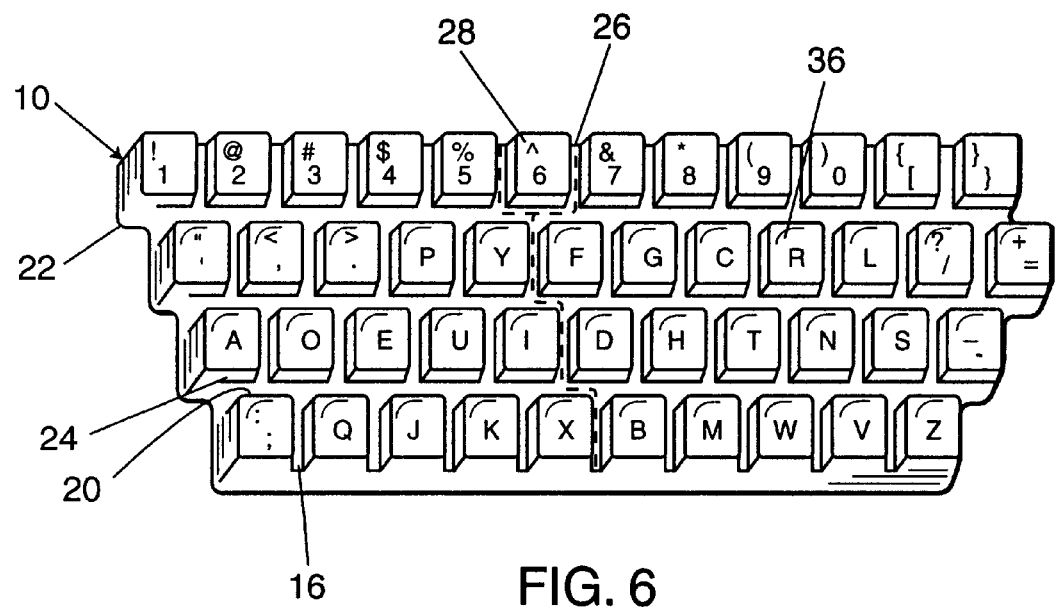
FIG. 6 is a second, co-preferred embodiment illustrating imprinted Dvorak layout displayed on the key tops.

A Dvorak keyboard, FIG. 6, with its unique keyboard layout 36 is another variation of foreign language Embodiment 2. Most computer operating systems and some software programs include a Dvorak keyboard preference option. An opaque, four-row, one-size-fits-all cover 10 with Dvorak keyboard layout 36 imprinted on it is easily installed and removed and would permit easy conversion from the QWERTY keyboard layout to the Dvorak keyboard layout and vise versa. Line 26 indicates a marked midline indicator enabling dividing or splitting the keyboard cover along the left and right vertical groove of the 6 key 28, and extending downward along left vertical grooves of Y, H, and N keys 32 for use on the split/ergonomic keyboard. Cover 10 is manufactured including but not limited the use of current, conventional polyurethane imprinting/molding processes and materials.

Conclusions, Ramifications, and Scope of Invention

Thus, it can be seen that the opaque, three- or four-row computer keyboard cover provides a one-size-fits-all, opaque/peek-proof, inexpensive-to-make-and-sell device, which is easily installed and removed. This keyboard cover design will 1) make the advantages of an opaque keyboard cover readily available to teachers, students and retail consumers to accelerate keyboard memorization and 2) optimize use of computer operating system keyboard preference options for facile conversion to foreign language and Dvorak keyboard layouts.

While the above description contains many specificities, these should not be construed as limitations on the scope of the invention, but rather as an exemplification of two preferred embodiments thereof. Many other variations are possible. For example, 1. The shape could change to eliminate one or some of the punctuation or symbol keys.
2. The vertical and/or horizontal grooves between individual keys could be eliminated creating an a raised, non-grooved, long, full- or partial-row, or three- or four-row "bubble" configuration which covers all of the keys or one or more full or partial rows but which conforms to the three- or four-row shape.
3. The geometry of the key shapes could be slightly modified to be less or more tapered or rounded.
4. Different materials could be used, such as fabric or a future innovation in malleable, non-plastic materials.
5. The surface finish could be changed from smooth to textured.
6. The weight or thickness of plastics-type material could be made lighter or heavier.
7. A design or logo could be added to the perimeter or downward face of the keys or the key tops.
8. A method or device of attachment of the cover to a keyboard could be added such as Velcro, a physical or mechanical, or an adhesive device for security purposes.
9. Cover could be manufactured in two pieces by separating or cutting the cover along the midline indicator for use on the split/ergonomic keyboard.
10. Cover could be manufactured in more than two pieces.
11. Or marketed as an opaque, protective three- or four-row cover.
12. More than one language layout could be imprinted on one cover.
13. Imprinting of layout could be flat, embossed, or reversed-embossed.
14. Cover could be manufactured to fit laptop keyboards
15. Cover could be manufactured with no vertical or horizontal grooves and cut in a lattice fashion connecting only and all key top corners using polyurethane or fabric such as nylon or other touch-sensitive, malleable material.

All the foregoing would be included within the scope of the invention. Accordingly, the scope of the invention should be determined not by the embodiments illustrated, but by the appended claims and their legal equivalents.

We claim:

1. A cover for a partial section of a keyboard having a frame and multiple alpha-numeric, function and format keys, the cover comprising:

a resiliently flexible non-transparent body which is configured to only overlie a predetermined number of non-format and non-function keys totaling less than all of the keys of the keyboard;

a wall extending downwardly from a perimeter of the body; and grooves within the body and configured so that the body individually form-fits the predetermined number of keys, whereby the cover is adapted for use on a variety of keyboards.

2. The cover of claim 1, wherein the wall envelops peripheral keys of the predetermined number of keys.

3. The cover of claim 1, wherein the body overlies all alphabetical keys of the keyboard.

4. The cover of claim 3, wherein the body further overlies numerical keys of the keyboard.

5. The cover of claim 1, wherein a top surface of the body includes character inscriptions.

6. The cover of claim 5, wherein the character inscriptions comprise foreign language alpha-numeric symbols.

7. The cover of claim 5, wherein the character inscriptions comprise Dvorak keyboard symbols.

8. The cover of claim 1, including a mid-line marking which defines a separation line for adapting the cover to an ergonomic keyboard having a separation between two sets of keys.

9. The cover of claim 8, wherein the mid-line marking is perforated.

10. The cover of claim 1, wherein the body removably rests on the predetermined keys of the keyboard.

11. The cover of claim 1, wherein a top surface of the body includes home-row indication protrusions.

12. A cover for a partial section of a keyboard having a frame and multiple alpha-numeric, function and format keys, the cover comprising:

a resiliently flexible non-transparent body having home-row indicating protrusions and configured to only overlie a predetermined number of non-format and non-function keys totaling less than all of the keys of the keyboard;

a wall extending downwardly from a perimeter of the body which envelops peripheral keys of the predetermined number of keys;

grooves within the body and configured so that the body form-fits the individual predetermined number of keys; and a perforated mid-line marking which defines a separation line for adapting the cover to an ergonomic keyboard having a separation between two sets of keys, whereby the cover is adapted for use on a variety of keyboards.

13. The cover of claim 12, wherein the body overlies all alpha-numeric keys of the keyboard.

14. The cover of claim 12, wherein the body includes character inscriptions comprising Dvorak keyboard symbols.

15. The cover of claim 12, wherein the body removably rests on the predetermined keys of the keyboard.

16. A combination keyboard and partial cover, comprising:

a keyboard having multiple alpha-numeric, format and function keys, and a cover removably resting on the keyboard and comprised of a resiliently flexible non-transparent body which overlies a predetermined number of non-format and non-function keys totaling less than all of the keys of the keyboard, a wall extending downwardly from a perimeter of the body which envelops peripheral keys of the predetermined number of keys, and grooves within the body and configured so that the body form-fits the individual predetermined number of keys, whereby the cover is adapted for use on a variety of keyboards.

17. The combination of claim 16, wherein the body overlies all alpha-numerical keys of the keyboard.

18. The combination of claim 17, wherein a top surface of the body includes character inscriptions.

19. The combination of claim 18, wherein the character inscriptions comprise Dvorak keyboard symbols.

20. The combination of claim 17, including a perforated mid-line marking which defines a separation line for adapting the body to an ergonomic keyboard having a separation between two sets of keys.

* * * * *